United States Patent
Haller et al.

(10) Patent No.: US 9,120,409 B2
(45) Date of Patent: Sep. 1, 2015

(54) HORIZONTAL SEAT ADJUSTMENT MEANS WITH SETTING MEMBER

(75) Inventors: Erwin Haller, Birgland (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 754 days.

(21) Appl. No.: 13/328,835

(22) Filed: Dec. 16, 2011

(65) Prior Publication Data

US 2012/0153689 A1    Jun. 21, 2012

(30) Foreign Application Priority Data

Dec. 21, 2010  (DE) .......................... 10 2010 055 344

(51) Int. Cl.
| | | |
|---|---|---|
| A47C 1/00 | (2006.01) | |
| B60N 2/50 | (2006.01) | |
| B60N 2/06 | (2006.01) | |
| B60N 2/52 | (2006.01) | |
| B60N 2/54 | (2006.01) | |

(52) U.S. Cl.
CPC ........ *B60N 2/501* (2013.01); *B60N 2/06* (2013.01); *B60N 2/525* (2013.01); *B60N 2/544* (2013.01)

(58) Field of Classification Search
USPC .............. 297/216.16, 344.1, 344.11, 344.15, 297/344.16
See application file for complete search history.

(56) References Cited

U.S. PATENT DOCUMENTS

| | | |
|---|---|---|
| 2,118,456 A | 5/1938 | Whedon |
| 3,300,203 A | 1/1967 | Carter et al. |
| 3,704,767 A | 12/1972 | Takagi |
| 3,706,362 A | 12/1972 | Faure |
| 3,752,432 A | 8/1973 | Lowe |
| 4,151,973 A | 5/1979 | Sedlock |
| 4,213,594 A | 7/1980 | Pietsch et al. |
| 4,286,765 A | 9/1981 | Delgleize et al. |
| 4,350,317 A | 9/1982 | Aondetto |
| 4,408,744 A | 10/1983 | Thompson |
| 4,451,079 A | 5/1984 | Takahashi |
| 4,477,050 A | 10/1984 | Thompson |
| 4,573,657 A | 3/1986 | Sakamoto |

(Continued)

FOREIGN PATENT DOCUMENTS

| | | |
|---|---|---|
| CN | 100493951 C | 6/2009 |
| DE | 1 898 307 U | 8/1964 |

(Continued)

OTHER PUBLICATIONS

Office Action corresponding to German Patent Application No. 10 2010 055 344.1, dated Mar. 13, 2014.

(Continued)

*Primary Examiner* — Laurie Cranmer
(74) *Attorney, Agent, or Firm* — Lathrop & Gage LLP (57) ABSTRACT

The invention relates to a seat for a vehicle, in particular for all-terrain vehicles, with at least one seat area extending in the longitudinal direction (X) of the vehicle and in the width-wise direction (Y) of the vehicle for receiving a person, a backrest for supporting the back of the person and a holding device connected in the vertical direction (Z) under the seat area and to the latter for keeping the seat area at a distance from a coupling region for coupling the seat to the vehicle, wherein the holding device has at least one spring device for the movable arrangement at least for a time of at least the seat area with respect to the coupling region in the longitudinal direction (X) of the vehicle and/or in the width-wise direction (Y) of the vehicle.

11 Claims, 3 Drawing Sheets

(56) References Cited

U.S. PATENT DOCUMENTS

| | | | |
|---|---|---|---|
| 4,645,169 A | | 2/1987 | Mischer |
| 4,678,155 A | * | 7/1987 | Carter ........................ 248/564 |
| 4,679,760 A | * | 7/1987 | Dotzler et al. .............. 248/602 |
| 4,684,100 A | | 8/1987 | Grassl |
| 4,714,227 A | * | 12/1987 | Holm et al. .................. 248/595 |
| 4,729,539 A | | 3/1988 | Nagata |
| 4,773,671 A | | 9/1988 | Inagaki |
| 4,784,434 A | | 11/1988 | Iwami |
| 4,856,763 A | | 8/1989 | Brodersen et al. |
| 4,943,037 A | | 7/1990 | Brodersen et al. |
| 4,961,482 A | | 10/1990 | Pohlenz et al. |
| 4,993,778 A | | 2/1991 | Colin et al. |
| 5,058,852 A | | 10/1991 | Meier et al. |
| 5,125,631 A | | 6/1992 | Brodersen et al. |
| 5,211,369 A | | 5/1993 | Hoemer |
| 5,251,864 A | | 10/1993 | Itou |
| 5,364,060 A | | 11/1994 | Donovan et al. |
| 5,521,821 A | | 5/1996 | Shimizu et al. |
| 5,533,703 A | | 7/1996 | Grassl et al. |
| 5,553,911 A | | 9/1996 | Bodin et al. |
| 5,582,385 A | * | 12/1996 | Boyle et al. .................. 248/550 |
| 5,735,509 A | | 4/1998 | Gryp et al. |
| 5,765,802 A | | 6/1998 | Bostrom et al. |
| 5,791,738 A | | 8/1998 | Niezoldt |
| 5,794,911 A | | 8/1998 | Hill |
| 5,871,198 A | | 2/1999 | Bostrom et al. |
| 5,957,426 A | | 9/1999 | Brodersen |
| 5,967,604 A | | 10/1999 | Yoshida et al. |
| 5,971,116 A | | 10/1999 | Franklin |
| 6,042,093 A | | 3/2000 | Garelick |
| 6,340,201 B1 | | 1/2002 | Higuchi |
| 6,478,102 B1 | | 11/2002 | Puterbaugh et al. |
| 6,543,755 B2 | | 4/2003 | Monson et al. |
| 6,616,116 B1 | | 9/2003 | Rochau et al. |
| 6,637,735 B2 | | 10/2003 | Monson et al. |
| 6,763,550 B2 | | 7/2004 | Regnier |
| 6,802,408 B2 | | 10/2004 | Krammer |
| 7,044,553 B2 | | 5/2006 | Ropp |
| 7,152,839 B2 | * | 12/2006 | Mullinix et al. ............... 248/421 |
| 7,168,671 B2 | | 1/2007 | Bostrom et al. |
| 7,185,867 B2 | | 3/2007 | Hill et al. |
| 7,377,533 B2 | | 5/2008 | Takeuchi et al. |
| 7,694,946 B2 | * | 4/2010 | Shoemaker et al. ...... 267/140.15 |
| 7,712,836 B2 | | 5/2010 | Deml |
| 7,810,884 B2 | | 10/2010 | Lorey et al. |
| 7,886,882 B2 | | 2/2011 | Behmenburg et al. |
| 7,942,248 B2 | | 5/2011 | St. Clair et al. |
| 8,118,287 B2 | | 2/2012 | Schordine |
| 8,182,038 B2 | * | 5/2012 | Haller ...................... 297/344.16 |
| 8,457,841 B2 | | 6/2013 | Knoll et al. |
| 8,465,094 B2 | * | 6/2013 | Wada ........................ 297/344.1 |
| 8,469,450 B2 | * | 6/2013 | Wahls et al. .............. 297/344.17 |
| 8,540,316 B2 | * | 9/2013 | Deml et al. ............... 297/344.15 |
| 8,561,748 B1 | * | 10/2013 | Hahn et al. ................... 180/326 |
| 8,678,508 B2 | * | 3/2014 | Kolb .......................... 297/463.2 |
| 2001/0035600 A1 | | 11/2001 | St. Clair |
| 2002/0011699 A1 | | 1/2002 | St.Clair |
| 2006/0243548 A1 | | 11/2006 | Stein et al. |
| 2006/0278805 A1 | | 12/2006 | Haller |
| 2007/0278723 A1 | | 12/2007 | Shoemaker et al. |
| 2008/0000738 A1 | | 1/2008 | Zdeb |
| 2008/0000739 A1 | | 1/2008 | Behmenburg et al. |
| 2008/0088165 A1 | | 4/2008 | Deml |
| 2008/0156602 A1 | | 7/2008 | Hiemenz et al. |
| 2008/0197684 A1 | | 8/2008 | Ott et al. |
| 2009/0134595 A1 | | 5/2009 | Haller et al. |
| 2009/0179390 A1 | | 7/2009 | Wurmthaler et al. |
| 2009/0184448 A1 | | 7/2009 | Hiser |
| 2009/0256293 A1 | | 10/2009 | Ward |
| 2009/0283944 A1 | | 11/2009 | Schordine |
| 2010/0052356 A1 | | 3/2010 | Lewis, II |
| 2010/0072685 A1 | | 3/2010 | Golpe et al. |
| 2010/0072800 A1 | | 3/2010 | Weber et al. |
| 2010/0102493 A1 | | 4/2010 | Deml et al. |
| 2010/0117428 A1 | | 5/2010 | Deml et al. |
| 2011/0001033 A1 | | 1/2011 | Kohl et al. |
| 2011/0001342 A1 | | 1/2011 | Deml et al. |
| 2011/0022265 A1 | | 1/2011 | Sekiya |
| 2011/0226930 A1 | | 9/2011 | Enns et al. |
| 2011/0278894 A1 | | 11/2011 | Lorey |
| 2012/0025577 A1 | | 2/2012 | Kolb |
| 2012/0043798 A1 | | 2/2012 | Haller et al. |
| 2012/0049421 A1 | | 3/2012 | Haller |
| 2012/0086159 A1 | | 4/2012 | Kolb |
| 2012/0090930 A1 | | 4/2012 | Haller |
| 2012/0091773 A1 | | 4/2012 | Lorey |
| 2012/0126592 A1 | | 5/2012 | Kaessner et al. |
| 2012/0153689 A1 | | 6/2012 | Haller et al. |
| 2012/0153695 A1 | | 6/2012 | Haller et al. |
| 2012/0187615 A1 | | 7/2012 | Haller et al. |

FOREIGN PATENT DOCUMENTS

| | | |
|---|---|---|
| DE | 15 55 056 | 3/1970 |
| DE | 19 16 403 A1 | 10/1970 |
| DE | 2022021 | 11/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 3517345 A1 | 11/1986 |
| DE | 3813402 | 11/1989 |
| DE | 38 24 272 A1 | 3/1990 |
| DE | 41 01 221 A1 | 7/1992 |
| DE | 9402417 | 4/1994 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 | 5/2004 |
| DE | 10347219 | 5/2005 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 602005001868 | 12/2007 |
| DE | 10 2007 030 467 A1 | 1/2009 |
| DE | 102008040011 | 5/2009 |
| DE | 10 2008 016 685 B3 | 6/2009 |
| DE | 10 2008 016685 B3 | 6/2009 |
| DE | 10 2008 010 719 A1 | 8/2009 |
| DE | 10 2008 045 492 A1 | 3/2010 |
| DE | 10 2008 052 960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | S 6218346 A | 1/1987 |
| JP | S 6218347 A | 1/1987 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Office Action for German Patent Application No. 10 2010 048 210.2, mailed Jul. 7, 2011.
Office Action for German patent Application No. 10 2010 051 325.3, mailed Oct. 10, 2011.
Examination Report dated Aug. 24, 2012, from the German Patent Office for German Patent Application No. 10 2010 026 569.1.

(56) References Cited

OTHER PUBLICATIONS

First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Examination Report for German Patent Application No. 10 2011 009 530.6 dated May 4, 2012.
Extended European Search Report for European Patent Application No. 12 15 9863, dated Jul. 4, 2012.
Office Action for German Patent Application No. 10 2011 015 364.0, mailed Feb. 6, 2012.
Search Report for European Patent Application No. 11177689.4, mailed Dec. 14, 2011.
Office Action for German Patent Application No. 10 2010 035 888.6 mailed Jun. 9, 2011.
Extended European Search Report for parallel European Patent Application No. 11 19 5031, mailed Apr. 5, 2012.
Office Action for German Patent Application No. 10 2010 055 342.5, mailed Oct. 6, 2011.
Office Action for German Patent Application No. 10 2010 055 344.1, mailed Oct. 5, 2011.
Office Action corresponding to German Patent Application No. 102010045114.2, completed Nov. 8, 2013.
Extended European Search Report for parallel European Patent Application No. 11 19 5039, mailed Apr. 5, 2012.
European Search Report for European Patent Application No. 12 159 863.5, mailed Jul. 10, 2013.

* cited by examiner

Fig. 2

HORIZONTAL SEAT ADJUSTMENT MEANS WITH SETTING MEMBER

CROSS-REFERENCE TO RELATED APPLICATION

This application claims the benefit of priority from German Patent Application No. 10 2010 055 344.1, filed Dec. 21, 2010, which is hereby incorporated by reference in its entirety.

DESCRIPTION

The invention relates to a seat suspension system, in particular a horizontal seat suspension system, for vehicle seats according to the preamble of claim 1.

The horizontal vehicle seat suspension systems known from the prior art always require the application of a spring element orientated in the direction to be sprung. An arrangement of this type leads to the vehicle seat suspension system for achieving a specific spring characteristic in the direction to be sprung becoming very large or only a correspondingly smaller spring characteristic being able to be used, as a result of which, however, the spring characteristic desired cannot be achieved. In addition, the spring characteristic lines of the spring elements known from the prior art are not capable of being altered or influenced, on account of which the resulting spring characteristic is not at an optimum.

The object of the present invention is thus to provide a vehicle seat suspension system for cushioning substantially horizontal stimuli, which provides an improved spring characteristic without giving rise to the drawbacks of the prior art in this case.

The object specified above is attained according to the invention by a seat for a vehicle, in particular for all-terrain vehicles, with at least one seat area extending in the longitudinal direction of the vehicle or seat respectively and in the width-wise direction of the vehicle or seat respectively for receiving a person, a backrest for supporting the back of the person and a holding device connected in the vertical direction under the seat area and to the latter for keeping the seat area at a distance from a coupling region for coupling the seat to the vehicle, the holding device having at least one spring device for the movable arrangement at least for a time of at least the seat area with respect to the coupling region in the longitudinal direction of the vehicle and/or in the width-wise direction of the vehicle. In this case it is conceivable for the vehicle seat or the seat area respectively of the vehicle seat to be capable of being adjusted or displaced with respect to the vehicle in the width-wise direction of the vehicle and/or in the longitudinal direction of the vehicle.

According to the invention the spring device has at least one spring element which extends in an elongate manner between two application regions and which is capable of being bent by a deformation device at least for a time and the spring characteristic line of which is capable of being changed by at least one setting member arranged at an inclination to the spring element.

It is preferable for the spring element to extend substantially in a horizontal plane and, in a particularly preferred manner, precisely in a plane extending horizontally.

As well as other vehicles, it is preferable for all-terrain vehicles to be all agricultural vehicles, construction vehicles, military vehicles, water craft, sports vehicles etc. The term "at an inclination to its longitudinal direction" is preferably understood to be an angle of between 1° and 179°, preferably between 45° and 135° and in a particularly preferred manner an angle of between 80° and 100°, in particular an angle of substantially 90° or precisely 90°.

The solution according to the invention is advantageous since it is possible for the desired spring characteristic or the improvement of the spring characteristic to be achieved in a simple manner and with a long service life. In addition, the suspension system is preferably capable of being adapted to varying parameters, such as the weight of the passenger, the inclination of the vehicle, the rate of the introduction of force and/or other parameters.

In accordance with a further preferred embodiment of the present invention the deformation device forms a receiving region through which the spring element extends.

This embodiment is advantageous since on account of the receiving region the spring element is precisely positioned or is capable of being precisely positioned and a precise dimensioning and design of the spring element is therefore possible, as a result of which the service life and the costs of the vehicle seat suspension system as a whole are capable of being influenced in a positive manner.

In accordance with a further preferred embodiment of the present invention two contact elements form the receiving region and have contact face portions which are in contact with the spring element only for a time.

This embodiment is advantageous since a suspension of the vehicle seat is possible with preferably only one spring element in the width-wise direction of the vehicle and/or in the longitudinal direction of the vehicle, in particular in opposite directions. It is likewise possible, however, for a plurality of spring elements to be provided, in which case precisely one spring element or a plurality of spring elements is or are provided for the suspension of the seat or the seat area in the width-wise direction of the vehicle and/or precisely one spring element or a plurality of spring elements is or are provided for the suspension of the seat or the seat area in the width-wise direction of the vehicle.

In accordance with a further preferred embodiment of the present invention the contact face portions, which are preferably capable of being brought into contact with the spring element at least for a time, are bent at least locally. It is also particularly preferred for contact face portions which are straight or formed with a slight bend to be capable of being provided, which extend in a particularly preferred manner between the bent contact face portions and join the latter. A join of two bent contact face portions and one contact face portion—straight or provided with a smaller bend—arranged between them preferably forms a contact element.

This embodiment is advantageous since the spring element is capable of being deformed in a flowing movement and on a flowing transition, as a result of which a positive effect upon the spring characteristic on the one hand and a deformation of the spring element with very low loading on the other hand are achieved, since loading jumps are reduced or prevented.

In accordance with a further preferred embodiment of the present invention the setting member is operated in an electrical, mechanical, electro-mechanical, pneumatic or hydraulic manner. It is likewise possible for the setting member to be capable of being operated by a combination of the technical approaches specified above or by a similar technical approach.

This embodiment is advantageous since the energy sources present in the respective vehicle, such as for example current, compressed air, hydraulic system, can be used to operate the setting member or to transfer the setting member into another arrangement or to move the setting member into another position.

In accordance with a further preferred embodiment of the present invention at least one sensor unit is provided in order to detect for example seat movements, spring movements, movements of the deformation devices and/or vehicle movements, such as for example tilting movements, in particular in the longitudinal direction of the vehicle and/or in the widthwise direction of the vehicle, and/or in order to detect settings or positions of the seat, the spring, the deformation device and/or the vehicle for example with respect to the underlying surface or the surroundings, which transmits data to a control device for actuating the setting member. It is likewise possible, in order to detect individual or all the previously specified settings and/or movements, for a plurality of different sensor devices arranged at different positions to be provided. The sensor device preferably constitutes a path measurement system for detecting the position of the deformation device, the bending of the pneumatic spring element and/or the extension of the pneumatic spring element.

This embodiment is advantageous since a precise detection of the respective driving and/or sitting situation is possible, preferably in real time. In addition, it is possible for the data—detected by the sensor devices—from the vehicle seat or the vehicle to be stored so as to be capable of being evaluated for example at a later time, such as for example with a maintenance deadline.

In accordance with a further preferred embodiment of the present invention at least one setting member and preferably precisely one setting member is coupled to a contact element or an application region for the linear movement at least locally or the curved movement at least locally of the contact element or the application region. In this case a setting member can preferably be an element, in particular a piston element, a spindle element, a piezo element, a linear motor or the like, capable of being operated in an hydraulic, electrical, mechanical, pneumatic, electro-magnetic etc. manner. In this case it is possible for not only precisely one of the elements specified above to be provided, but also for a multiplicity of an element and/or a plurality of elements to be provided.

This embodiment is advantageous since the spring characteristic or damping characteristic of the seat according to the invention is capable of being influenced in a simple and reliable manner in dependency upon any desired parameters, in particular the weight of the passenger, the power of the stimulus and/or the inclination of the vehicle.

In accordance with a further preferred embodiment of the present invention the spring element is a spiral spring, a helical spring or a pneumatic spring element, in particular a plastics material element in the form of a hose, which when bent by the deformation device undergoes a deviation in the width-wise direction of the vehicle seat and/or in the longitudinal direction of the vehicle seat and rests at least for a time on at least one of the bent contact face portions of the deformation device.

This embodiment is advantageous since it permits the use of a relatively large spring element in a small structural space, since the spring element is preferably arranged substantially horizontally and, in a particularly preferred manner, precisely horizontally and is thus capable of being loaded not in the longitudinal direction but transversely to the longitudinal direction or the extension direction.

In accordance with a further preferred embodiment of the present invention, with a first stimulus of the vehicle seat an actuation of the setting member in the same direction and in a manner adapted to the stimulus is capable of being carried out in order to change the position of the application region of the spring element, in particular the spiral spring or the pneumatic spring element, in order to eliminate the pre-stressing of the spring, and with a second stimulus of the vehicle seat an actuation of the setting member in the opposite direction and in a manner adapted to the stimulus is capable of being carried out in order to change the position of the application region, of the spring element, in particular the spiral spring or the pneumatic spring element, in order to strengthen the spring characteristic line, it being preferable for the second stimulus to be stronger than the first stimulus.

The expression "in the same direction" is preferably to be understood as a movement directed in the same direction and the expression "in the opposite direction" is preferably to be understood as a movement directed in a direction opposed to the direction of movement.

A change in the position of an application region of the spring element preferably corresponds to a displacement of a base point of the spring element. It is likewise possible for the two application regions and thus the two base points of a spring element to be displaceable.

This embodiment is advantageous since the spring characteristic line and thus the spring characteristic is capable of being influenced or changed in a manner dependent upon the power of the stimulus.

In accordance with a further preferred embodiment of the present invention, with a first stimulus of the vehicle seat an actuation of the setting member in the opposite direction and in a manner adapted to the stimulus is capable of being carried out in order to change the position of the bent contact face portion of the deformation device, in order to eliminate the pre-stressing of the spring element, in particular the pneumatic spring element or the spiral spring, and with a second stimulus of the vehicle seat an actuation of the setting member in the same direction and in a manner adapted to the stimulus is capable of being carried out in order to change the position of the bent contact face portion of the deformation device, in order to strengthen the spring characteristic line of the spring element, in particular the pneumatic spring element or the spiral spring, it being preferable for the second stimulus to be stronger than the first stimulus.

This embodiment is advantageous since the spring characteristic line and thus the spring characteristic is capable of being influenced or changed in a manner dependent upon the power of the stimulus.

German patent application no. 10 2010 055 342.5, filed Dec. 21, 2010, which relates to the suspension system of a vehicle seat in the width-wise direction of the vehicle and/or in the longitudinal direction of the vehicle, is hereby incorporated by reference in its entirety.

Further advantages, aims and properties of the present invention are explained with reference to the following description of accompanying drawings, in which vehicle seat suspension systems for the substantially horizontal suspension of a vehicle seat are illustrated by way of example. Components of the vehicle seat suspension systems which correspond at least substantially with respect to their function in the figures can be designated with the same references in this case, it being unnecessary for these components to be numbered or explained in all the figures. In the figures

Figure 1:
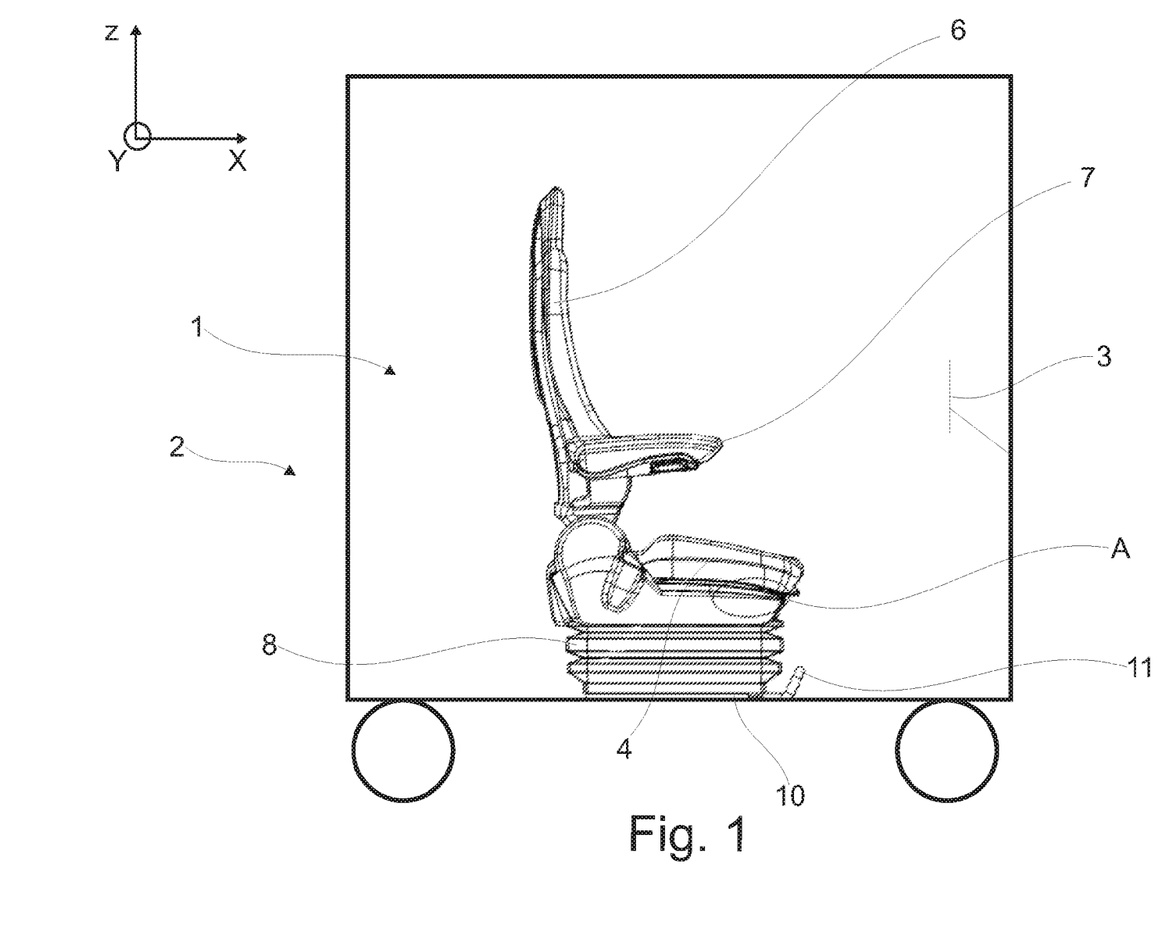
FIG. 1 is a diagrammatic illustration of a vehicle with a vehicle seat.

A seat 1 or a vehicle seat 1 in a vehicle 2 is illustrated in FIG. 1. The vehicle seat 1 is orientated in the longitudinal direction X of the vehicle and has a seat area 4 extending in the width-wise directions Y of the vehicle and in the longitudinal direction X of the vehicle as well as a backrest 6 which extends in the vertical direction Z of the vehicle and which is preferably arranged so as to be pivotable with respect to the seat area 4. A steering wheel which is capable of being operated by a person (not shown) sitting on the seat 1 is designated with the reference number 3. In addition, one or two armrests 7 are preferably arranged on the seat 1, in particular on the backrest 6.

The seat area 4 is preferably arranged at a distance from the top side of the vehicle floor by a holding region 8, in which case the vehicle 2 and the vehicle seat 1 are connected to each other by way of a coupling region 10 in a fixed manner or in a manner movable for a time. A movement of the seat 1 with respect to the vehicle 2 can be for example a displacement, in particular in the longitudinal direction X of the vehicle, in which case a displacement of the seat is capable of being influenced or controlled by means of the handle 11. The reference A designates a region in which the horizontal suspension system of the vehicle seat 1 is preferably arranged.

Figure 2:
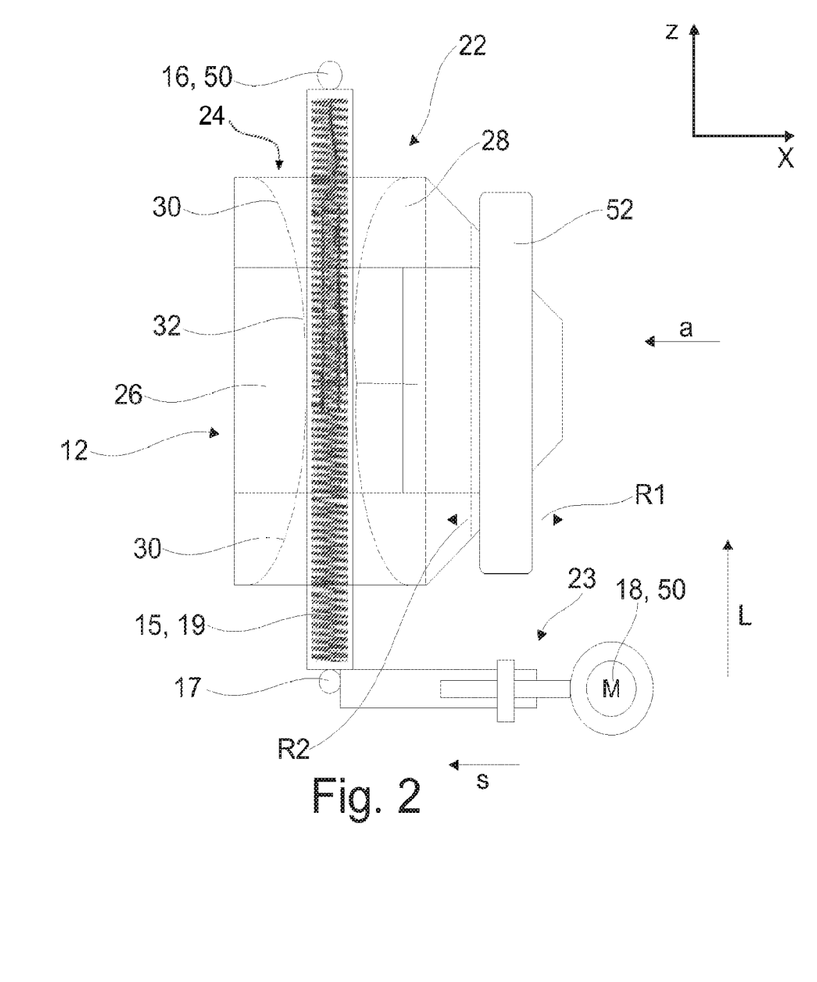
FIG. 2 is a diagrammatic two-dimensional illustration of a first embodiment of a spring device of a vehicle seat.

A spring device 12 preferably arranged in the region A (FIG. 1) for the substantially horizontal cushioning and/or damping of vibrations or stimuli introduced into the vehicle seat 1 is illustrated in FIG. 2. A direction inclined with respect to the vertical axis Z, in particular inclined substantially at an angle of 90° or inclined at an angle of precisely 90°, is preferably described as being substantially horizontal.

In this case it is conceivable for the spring element 15, 19 to extend with its longitudinal direction L substantially or completely in the longitudinal direction X of the seat or vehicle respectively and/or in the width-wise direction Y of the seat or vehicle respectively. A springing or damping preferably takes place substantially at a right angle to the longitudinal direction L of the spring element 15, 19 and, in a particularly preferred manner, precisely at a right angle to the longitudinal direction L of the spring element 15, 19.

The spring element, in particular the helical spring or spiral spring 19, extends preferably between an application region 16 and an application point 17, the first application region 16 preferably being arranged on the upper part 50 of the suspension or being connected to it and the application point 17 constituting a coupling region or a connection point, in particular a joint or a bearing, for connecting an end of the spring element 15, 19 to a setting member 23. The end of the spring element 15, 19 connected to the setting member 23 can be attached to the setting member 23 in a fixed or movable manner. The setting member 23 extends preferably between the application point 17 and the application region 18 on the upper part 50 of the suspension, in which case it is particularly preferred for the distance between the application region 18 on the upper part 50 of the suspension and the application point 17 to be capable of being changed by the setting member 23, in particular in a continuous manner or in steps.

The reference number 52 designates a lower part of the suspension which is preferably connected to the deformation device 22. It is preferable for the deformation device 22 to form a clasp-like device with a first contact element 26 and a second contact element 28 which are arranged at a distance from each other in the Y direction or at an inclination, in particular at a right angle, to the longitudinal direction L of the spring element 15, 19. The distance which the contact elements 26, 28 are from each other preferably corresponds substantially to the diameter of the spring element 15, 19, in particular in the relaxed state. The contact elements are preferably designed in a symmetrical manner and preferably have at their outer ends first contact face portions 30 which are connected to each other by a second contact face area 32. It is particularly preferred for the first contact face portions 30 to have a greater curvature or bending than the second contact face portions 32.

Directions of movement of the lower part 52 of the spring and of the deformation device 22 connected to it are designated by the references R1 and R2. If the setting member 23 is fixed or if the setting member 23 is not moved, with a spring element 15, 19 resting against the two contact elements 26, 28 any deviation or movement of the lower part 52 of the spring in the R1 or R2 direction leads to a deviation of the spring element 15, 19 at an inclination to the longitudinal direction L of the latter, in particular at a right angle to it.

It is conceivable for the spring element 15, 19 to be narrower than the distance between the contact elements 26, 28 and for a movement of the lower part 52 of the spring not to result directly in a deviation of the spring element 15, 19.

In this way, when the setting member 23 is not moved, a displacement of the deformation region 22 takes place in a manner dependent upon the power of the stimulus, as a result of which the first and the second contact face portions 30, 32 are preferably brought at least for a time into contact with the spring element 15, 19, and in particular the spring element 15, 19 is brought against the contact face portions 30, 32 of a contact element 26, 28.

In the case of a setting member 23 which is not stationary, a longitudinal change of the setting member 23 or a change in the position of the application point 17 with respect to the position of the application region 18 is capable of being carried out in a manner dependent upon the stimulus or an acceleration of the lower part 52 of the spring illustrated by the arrow a. In the case of a slight stimulus it is preferable for an actuation of the adjustment of the setting member 23 in the same direction, in particular in the form of a linear adjustment s, with the acceleration a to take place. This causes a reduction or elimination of the pre-stressing of the spring, since the spring element 15, 19 extends preferably substantially without a curve and, in a particularly preferred manner, completely without a curve between the application region 16 and the application point 17 and thus gives way to a curvature by the deformation device 22.

In the case of a powerful stimulus it is preferable for an actuation of the setting member 23 in the opposite direction, in particular of the linear adjustment s, to the acceleration a to take place, i.e. if a powerful stimulus acts upon the lower part 52 of the spring in the direction of the arrow a it is preferable for an adjustment of the setting member 23 to take place in a direction opposed to the direction of the arrow s. The distance between the application point 17 and the application region 18 is thus preferably reduced. The actuation of the setting member 23 in the opposite direction thus causes a strengthening of the spring characteristic line, as a result of which a possible striking is prevented. After the decline of the acceleration a the linear adjustment s is preferably returned to the starting position.

In the case of long-term deviations, in particular in up-hill and down-hill travel, it is preferable for a constant linear adjustment to take place in order to counteract the slope power take-off force.

Figure 3:
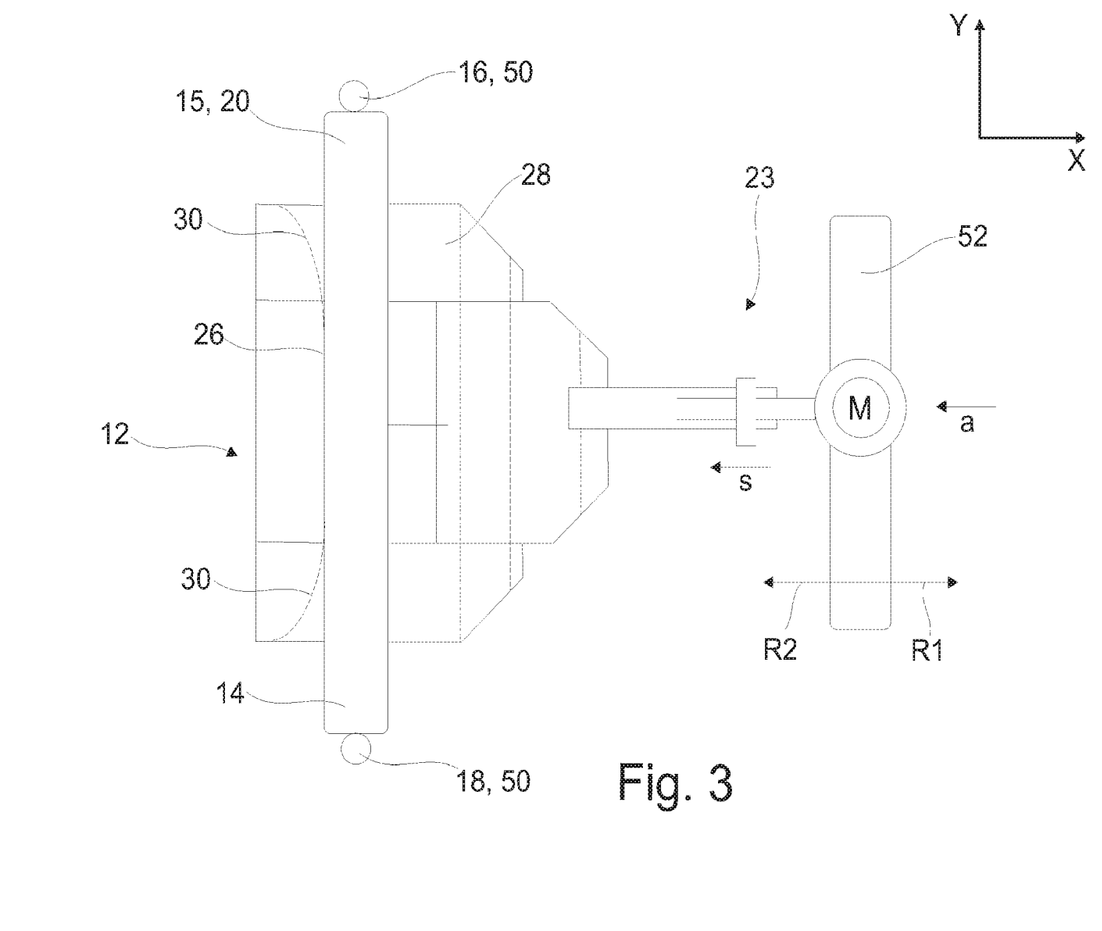
FIG. 3 is a diagrammatic two-dimensional illustration of a second embodiment of a spring device of a vehicle seat.

A two-dimensional illustration of a further embodiment of the present invention is illustrated in FIG. 3. A deformation device 22 with contact elements 26, 28 and contact face areas 30, 32 may likewise be seen in FIG. 3, as in FIG. 2. The spring element 15, 20, in particular a pneumatic spring element 20 and preferably a spring element 20 in the form of a hose or like a hose consisting of a flexible material, such as for example plastics material or rubber, extends between two application regions 16, 18 which are preferably both connected to the upper part 50 of the suspension or are arranged directly on it, and it is preferable for it to be surrounded likewise at an inclination to its longitudinal direction L by contact elements 26, 28 which are preferably arranged in the same plane. In this embodiment the setting member 23 is preferably arranged between the lower part 52 of the suspension and the deformation device 22 and connects the deformation device 22 to the lower part 52 of the suspension. The reference number 14 designates the receiving volume of the pneumatic spring element 15, 20 which is preferably enclosed, i.e. it is preferable for no conveying of gas to be possible into the pneumatic spring element 15, 20 or out of the pneumatic spring element 15, 20. It is also possible, however, for the pneumatic spring element 15, 20 to be provided with a valve device (not shown) and for gas to be capable of being supplied to or removed from the receiving space 14 by way of this valve device in a permanent manner or only for a time.

In the case of a slight stimulus it is preferable for an actuation of the setting member 23 in the opposite direction, in particular of the linear adjustment s, to the acceleration a to take place, i.e. in the case of an acceleration in the direction of the arrow a a linear adjustment takes place in a direction opposed to the direction of the arrow s. This causes a reduction or an elimination of the pre-stressing force of the spring, since the acceleration a is preferably counteracted or is capable of being counteracted exclusively by a counter movement or compensation movement of the setting member 23.

In the case of a powerful stimulus it is preferable for an actuation of the setting member 23 in the same direction, in particular of the linear adjustment s, with the acceleration a to take place. This causes a strengthened spring characteristic line, since a specified deviation of the spring element 15, 20, in particular a specified compression of the gas in the pneumatic spring element 20, which is preferably air, is achieved earlier, as a result of which a striking is prevented or is capable of being prevented. After the decline of the acceleration a the setting member 23, in particular the linear adjustment s, is preferably returned to the starting position.

In the case of long-term deviations, in particular in up-hill and down-hill travel, a constant linear adjustment preferably likewise takes place in order to counteract the slope power take-off force.

The present invention thus preferably describes the change in the pre-stressing of a spring element 15, 19, 20 by the adjustment of one or both of the spring articulation points on the upper part of the spring or on the lower part of the spring.

It is additionally possible for the first and second embodiments to be combined with each other to form a third embodiment, i.e. two setting members 23 for the adjustment of the deformation device 22 and at least one spring articulation point or application region 16, 18 and/or the interchanged use of spiral or helical springs 19 and a pneumatic spring element 20 or pneumatic muscle 20.

It should be mentioned at this point that the Applicants reserve the right to claim all the features disclosed in the application documents, insofar as either individually or in combination with one another they further develop in an advantageous manner vehicle seats according to the category or known from the prior art.

Certain features disclosed in the application are understood to be novel, including for example, features either individually or in combination with other features as compared with the prior art.

LIST OF REFERENCES

1 seat/vehicle seat
2 vehicle
3 steering wheel
4 seat area
6 backrest
7 armrest
8 holding device
10 coupling region
11 handle
12 spring device
14 receiving volume
16 first application region
17 joint/application point
18 second application region
19 spiral spring
20 fluid spring element
22 deformation device
23 setting member
24 receiving region
26 first contact element
28 second contact element
30 first contact face portions
32 second contact face portions
50 upper part of the suspension
52 lower part of the suspension
53 sensor unit
54 control device
A application region
L longitudinal direction
R1 first direction
R2 second direction
X longitudinal direction of the vehicle or seat
Y width-wise direction of the vehicle or seat
Z height direction of the vehicle or seat/vertical direction
a acceleration
s linear adjustment

The invention claimed is:

1. A seat for a vehicle, comprising at least one seat area extending in the longitudinal direction (X) of the vehicle and in the width-wise direction (Y) of the vehicle for receiving a person, a backrest for supporting the back of the person and a holding device connected in the vertical direction (Z) under the seat area and to the latter for keeping the seat area at a distance from a coupling region for coupling the seat to the vehicle, wherein the holding device has at least one spring device for the movable arrangement at least for a time of at least the seat area with respect to the coupling region in the longitudinal direction (X) of the vehicle and/or in the width-wise direction (Y) of the vehicle, wherein the spring device has at least one spring element which extends in an elongate manner and substantially in a horizontal plane between two application regions and which is capable of being bent by a deformation device at least temporarily and a spring characteristic line of which is capable of being changed by at least one adjustable setting member arranged at an inclination to the spring element, wherein the deformation device forms a receiving region through which the spring element extends.

2. The vehicle seat according to claim 1, wherein two contact elements form the receiving region and have contact face portions which are in contact with the spring element only temporarily.

3. The vehicle seat according to claim 2, wherein the contact face portions are bent at least locally.

4. The vehicle seat according to claim 1, wherein the adjustable setting member is capable of being operated in an electrical, mechanical, pneumatic or hydraulic manner or by combinations thereof.

5. The vehicle seat according to claim 1, wherein at least one sensor unit is provided in order to detect seat movements and/or vehicle movements wherein the at least one sensor unit transmits data to a control device for changing the setting of the adjustable setting member.

6. vehicle seat according to claim 5, wherein the least one sensor unit detects seat movements and/or vehicle movements in the longitudinal direction (X) of the vehicle and/or in the width-wise direction (Y) of the vehicle.

7. The vehicle seat according to claim 1, wherein the at least one adjustable setting member is coupled to a contact element or one of the two application regions for the linear movement of the contact element or the application region.

8. The vehicle seat according to claim 1, wherein the spring element is a spiral spring or a pneumatic spring element, which when bent by the deformation device undergoes a deviation in the width-wise direction (Y) of the vehicle seat and/or in the longitudinal direction (X) of the vehicle seat and rests on at least one bent contact face portion of the deformation device.

9. The vehicle seat according to claim 8, wherein with a first stimulus of the vehicle seat an actuation of the adjustable setting member in the same direction as the first stimulus and in a manner adapted to the first stimulus is capable of being carried out in order to change a position of the spiral spring in order to eliminate pre-stressing of the spring, and with a second stimulus of the vehicle seat an actuation of the adjustable setting member in the opposite direction of the second stimulus and in a manner adapted to the second stimulus is capable of being carried out in order to change the position of the spiral spring in order to strengthen the spring characteristic line, wherein the second stimulus is stronger than the first stimulus.

10. The vehicle seat according to claim 8, wherein with a first stimulus of the vehicle seat an actuation of the setting member in the opposite direction of the first stimulus and in a manner adapted to the first stimulus is capable of being carried out in order to change the position of the bent contact face portion of the deformation device, in order to eliminate pre-stressing of the pneumatic spring element, and with a second stimulus of the vehicle seat an actuation of the adjustable setting member in the same direction as the second stimulus and in a manner adapted to the second stimulus is capable of being carried out in order to change the position of the bent contact face portion of the deformation device, in order to strengthen the spring characteristic line of the pneumatic spring element, wherein the second stimulus is stronger than the first stimulus.

11. The vehicle seat according to claim 1, wherein the vehicle seat is configured for use in an all-terrain vehicle.

* * * * *